United States Patent
Al-Moayid et al.

(10) Patent No.: US 12,025,577 B2
(45) Date of Patent: Jul. 2, 2024

(54) REDUCED GRAPHENE-COBALT CHROMATE COMPOSITE COMPOSITION FOR HUMIDITY SENSOR APPLICATIONS AND ITS FABRICATION PROCESS AND SYSTEM

(71) Applicants: Mohd. Shkir, Abha (SA); King Khalid University, Abha (SA)

(72) Inventors: S. M. Al-Moayid, Abha (SA); Mohd. Shkir, Abha (SA); Haitham Elhosiny Ali, Abha (SA); Hamed Majdooa Algarni, Abha (SA); Jagadeesha Angadi V, Bangalore (IN); Mohd Ubaidullah, Riyadh (SA); Abdullah M. Al-Enizi, Riyadh (SA)

(73) Assignees: Shkir Mohd, Abha (SA); King Khalid University, Abha (SA)

( * ) Notice: Subject to any disclaimer, the term of this patent is extended or adjusted under 35 U.S.C. 154(b) by 0 days.

(21) Appl. No.: 18/184,355

(22) Filed: Mar. 15, 2023

(65) Prior Publication Data
US 2023/0221273 A1 Jul. 13, 2023

(51) Int. Cl.
| | |
|---|---|
| *H01B 1/04* | (2006.01) |
| *B01J 6/00* | (2006.01) |
| *B01J 19/00* | (2006.01) |
| *B01J 19/18* | (2006.01) |
| *C01B 32/182* | (2017.01) |
| *G01N 27/12* | (2006.01) |

(52) U.S. Cl.
CPC ............ *G01N 27/121* (2013.01); *B01J 6/008* (2013.01); *B01J 19/0066* (2013.01); *B01J 19/1862* (2013.01); *C01B 32/182* (2017.08); *G01N 27/125* (2013.01); *H01B 1/04* (2013.01)

(58) Field of Classification Search
CPC ............ H01B 1/00; H01B 1/04; C01B 32/182
See application file for complete search history.

(56) References Cited

U.S. PATENT DOCUMENTS

| | | | |
|---|---|---|---|
| 9,050,605 B2 * | 6/2015 | Guo ........................ | B03C 1/00 |
| 2013/0240439 A1 * | 9/2013 | Pradeep ............ | B01J 20/28016 |
| | | | 428/458 |

OTHER PUBLICATIONS

Pushkar et al "Exploring the use of 3 dimensional low-cost sugar-urea carbon foam electrode in the benthic microbial fuel cell", Renewable Energy 147 (2020) 2032-2042.*

(Continued)

*Primary Examiner* — Mark Kopec
(74) *Attorney, Agent, or Firm* — Perilla Knox & Hildebrandt LLP; Kenneth A. Knox

(57) ABSTRACT

The present invention generally relates to a system for preparing reduced graphene-cobalt chromate composite for humidity sensor applications comprises a first glass beaker for pouring 3-7 grams of sucrose; a preheated muffle furnace for heating the first glass beaker containing sucrose for 5-15 minutes at 450-500° C. in an oxygen environment and obtaining the black foam of rGO after hydrating the sugar; a second glass beaker for mixing 3-7 grams rGO, 3-7 grams carbamide, 3-7 grams cobaltous, and 3-7 grams chromium nitrate and dissolving with double-distilled water; and a magnetic stirrer for stirring the mixed solution for 450 minutes to generate a homogenous solution and burning the uniform mixture at 425° C. in the preheated muffle furnace for 20 minutes to obtain graphene-cobalt chromate composite.

2 Claims, 18 Drawing Sheets

(56) References Cited

OTHER PUBLICATIONS

Pan et al "Advanced Oxygen Reduction Electrocatalyst Based on Nitrogen-Doped Graphene Derived from Edible Sugar and Urea", dx.doi.org/10.1021/am403340f | ACS Appl. Mater. Interfaces 2013, 5, 11108-11114.*

Cao et al "Preparation of graphene oxide composite nitrogen-doped carbon (GO@NCs) by one-step carbonization with enhanced electrosorption performance for U(VI)", Journal of Water Process Engineering 48 (2022) 102930.*

Sadavar et al "Graphene Oxide as an Efficient Hybridization Matrix for Exploring Electrochemical Activity of Two-Dimensional Cobalt-Chromium-Layered Double Hydroxide-Based Nanohybrids", ACS Appl. Energy Mater. 2022, 5, 2083-2095.*

* cited by examiner

200

→ preparing black foam of reduced graphene oxide (rGO) after hydrating the 3-7 grams of sucrose using a preheated muffle furnace for 5-15 minutes ⟶ 202 mixing 3-7 grams rGO, 3-7 grams carbamide, 3-7 grams cobaltous, and 3-7 grams chromium nitrate in a glass beaker and dissolving with double-distilled water ⟶ 204 stirring the mixed solution for 450 minutes on a magnetic stirrer to generate a homogenous solution ⟶ 206 burning the uniform mixture at 425°C in the preheated muffle furnace for 20 minutes to obtain graphene-cobalt chromate composite ⟶ 208

Figure 2

REDUCED GRAPHENE-COBALT CHROMATE COMPOSITE COMPOSITION FOR HUMIDITY SENSOR APPLICATIONS AND ITS FABRICATION PROCESS AND SYSTEM

FIELD OF THE INVENTION

The present disclosure relates to a reduced graphene-cobalt chromate composite composition for humidity sensor applications and its fabrication process and system. The fabrication of monolayer of carbon atoms(rGO) composites is the cause of their poor performance in humidity sensors, which requires immediate investigation.

BACKGROUND OF THE INVENTION

Graphene and graphene-based materials have shown great potential for detecting humidity due to their ultrahigh specific surface areas, extremely high electron mobility at room temperature, and low electrical noise due to the quality of its crystal lattice and its very high electrical conductivity.

A graphene-based humidity sensor works on the principle that water molecules in the surrounding gas environment will adsorb onto the graphene surfaces, which in turn causes changes in various properties of the graphene materials that are proportional to the change in humidity. Different detecting techniques or sensor configurations have been utilised in the development of the numerous kinds of graphene-based humidity sensors that have been created. This section provides a concise introduction to the seven different sensing mechanisms that are typically utilised in graphene-based humidity sensors. Also included is an update on the development of graphene-based humidity sensors that are working in the last three sensing mechanisms, namely SAW, QCM, and optical fibre.

Reduced graphene(rGO) is a new member of the allotropic carbon family. Its distinguishing characteristics make it a potentially valuable material for various applications. It possesses 100 times the tensile strength of steel and is optically transparent, chemically inert, and electrically conductive. The number of such properties is growing as graphene is further studied. As the first discovered two-dimensional substance, it can assist us in further exploring and enhance two-dimensional material science. Starting with a poor yield micromechanical technique, several methods for "graphene synthesis" have been published, including micromechanical exfoliation, chemical approaches, "liquid-phase exfoliation", "chemical vapour deposition", and "epitaxial growth". In the age of "green synthesis", the essential synthetic criteria are yield, purity, environmental friendliness, and cost-effectiveness. The main issue in graphene production is to achieve high outcomes for industrial and everyday uses. Chemical techniques are frequently utilized to produce single-layer graphene on a big scale at a low cost. This procedure entails graphite oxidation, exfoliation, and, eventually, reduction. To increase the utilization of rGo, a composite of rGo and CCR is prepared. Spinel metal oxides are CCR nanoceramics. Spinel is one of the constituents of this family of multiferroic materials with the general formula $AB_2O_4$ that has piqued the interest of researchers due to its wide range of uses as energy storage materials. Considering the excellent properties of rGo and CCR have prepared a composite. Nowadays researchers are hard to get suitable humidity sensors. Hence, attempt to give superior humidity sensor materials for the scientific community by reporting rGo and CCR composite humidity sensor properties.

In the view of the forgoing discussion, it is clearly portrayed that there is a need to have a reduced graphene-cobalt chromate composite composition for humidity sensor applications and its fabrication process and system.

SUMMARY OF THE INVENTION

The present disclosure seeks to provide a system and process for preparing reduced graphene-cobalt chromate composite for humidity sensor applications and a reduced graphene-cobalt chromate composite composite. The fabrication of monolayer of carbon atoms(rGO) composites is the cause of their poor performance in humidity sensors, which requires immediate investigation. An attempt is made here to construct a cobalt chromate(CCR)-rGO composite. For large-scale manufacture of CCR-rGo composite, the technique is simple, cost-effective, and uncomplicated. The increased room temperature operable humidity sensing responsiveness of rGO-CCR composite is explored in this study. A simple method for producing reduced graphene oxide(rGO) on a wide scale has been discovered. For the first time, this has been accomplished using the combustion process. The sugar solution (ten grams of sugar and thirty milliliters of distilled water) is held at 450° C. in the muffle furnace for ten minutes. The current techniques for synthesizing rGO are straightforward and environmentally safe because no hazardous chemicals, metal catalysts, or solvents are used. Furthermore, this technology provides a low-cost, high-yielding route for preparing rGO. Further CCR are synthesized by solution combustion method. Crystallinity, phase and structural analysis are carried out using X-ray diffraction (XRD). The SEM micrographs shows that ultra-thin, wrinkled, paper-like, sphere shape, rod shape morphology. In addition to this, the EDX method is utilised in order to investigate the spatial distribution of the element. The most extraordinary sensing response for CCR-rGO between 11% and 97% relative humidity (RH) is 92%. The compound's response time is discovered to be 40 and 60 s, and the stability is examined over three months. Various adsorption process phases are used to describe the mechanism of humidity sensing schematically.

In an embodiment, reduced graphene-cobalt chromate composite composition for humidity sensor applications is disclosed. The composition includes a powder extract of sucrose, from 3-7 grams; a powder extract of carbamide, from 3-7 grams; a powder extract of cobaltous, from 3-7 grams; and a powder extract of chromium nitrate, from 3-7 grams.

In one embodiment, a system for preparing reduced graphene-cobalt chromate composite for humidity sensor applications is disclosed. The system includes a first glass beaker for pouring 3-7 grams of sucrose. The system further includes a preheated muffle furnace for heating the first glass beaker containing sucrose for 5-15 minutes at 450-500° C. in an oxygen environment and obtaining the black foam of rGO after hydrating the sugar. The system further includes a second glass beaker for mixing 3-7 grams rGO, 3-7 grams carbamide, 3-7 grams cobaltous, and 3-7 grams chromium nitrate and dissolving with double-distilled water. The system further includes a magnetic stirrer for stirring the mixed solution for 450 minutes to generate a homogenous solution and burning the uniform mixture at 425° C. in the preheated muffle furnace for 20 minutes to obtain graphene-cobalt chromate composite.

In another embodiment, a process for preparing reduced graphene-cobalt chromate composite for humidity sensor applications is disclosed. The process includes preparing black foam of reduced graphene oxide (rGO) after hydrating the 3-7 grams of sucrose using a preheated muffle furnace for 5-15 minutes. The further process includes mixing 3-7 grams rGO, 3-7 grams carbamide, 3-7 grams cobaltous, and 3-7 grams chromium nitrate in a second glass beaker and dissolving with double-distilled water. The further process includes stirring the mixed solution for 450 minutes on a magnetic stirrer to generate a homogenous solution. The further process includes burning the uniform mixture at 425° C. in the preheated muffle furnace for 20 minutes to obtain graphene-cobalt chromate composite.

An object of the present disclosure is to synthesize a cobalt chromate (CCR)-rGO composite.

Another object of the present disclosure is to fabricate rGO and creating CCR-rGO composite sensor to detect humidity at room temperature.

Yet another object of the present invention is to deliver an expeditious and cost-effective reduced graphene-cobalt chromate composite composition for humidity sensor applications.

To further clarify advantages and features of the present disclosure, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF FIGURES

These and other features, aspects, and advantages of the present disclosure will become better understood when the following detailed description is read with reference to the accompanying drawings in which like characters represent like parts throughout the drawings, wherein:

FIG. 2 illustrates a process for preparing reduced graphene-cobalt chromate composite for humidity sensor applications in accordance with an embodiment of the present disclosure;

Figure 1:
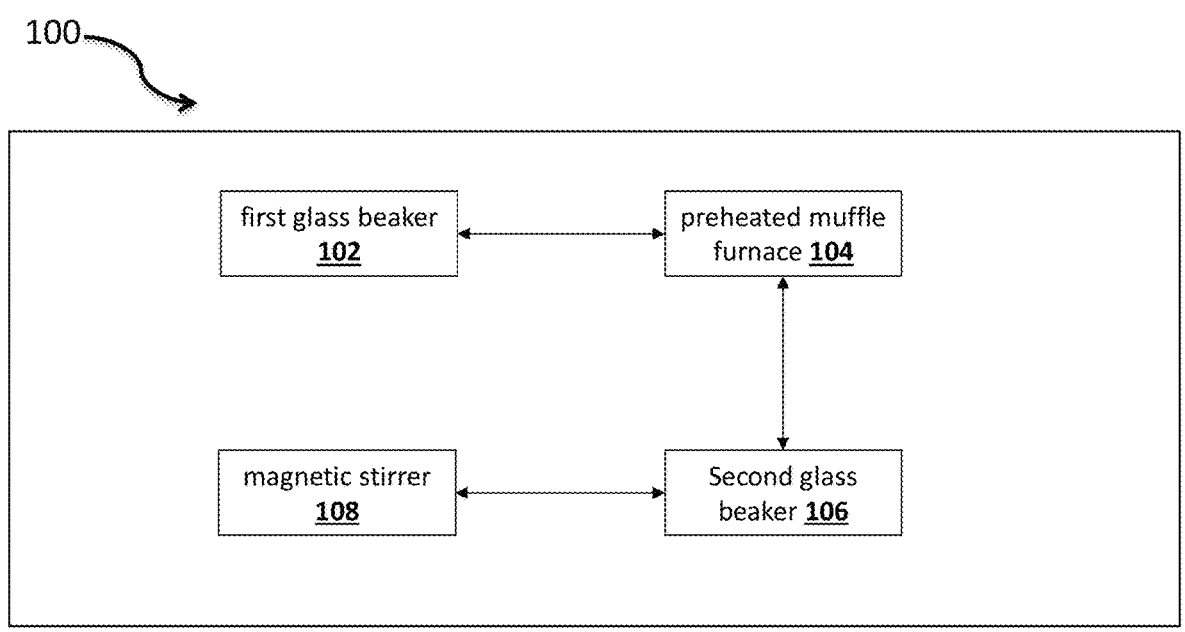
FIG. 1 illustrates a block diagram of a system for preparing reduced graphene-cobalt chromate composite for humidity sensor applications in accordance with an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present disclosure will be described below in detail with reference to the accompanying drawings.

In an embodiment, reduced graphene-cobalt chromate composite composition for humidity sensor applications is disclosed. The composition includes a powder extract of sucrose, from 3-7 grams; a powder extract of carbamide, from 3-7 grams; a powder extract of cobaltous, from 3-7 grams; and a powder extract of chromium nitrate, from 3-7 grams.

In another embodiment, weight amount of sucrose, carbamide, cobaltous, and chromium nitrate is preferably 5 grams.

Referring to FIG. 1, a block diagram of a system for preparing reduced graphene-cobalt chromate composite for humidity sensor applications is illustrated in accordance with an embodiment of the present disclosure. The system 100 includes a first glass beaker 102 for pouring 3-7 grams of sucrose.

In an embodiment, a preheated muffle furnace 104 is used for heating the first glass beaker 102 containing sucrose for 5-15 minutes at 450-500° C. in an oxygen environment and obtaining the black foam of rGO after hydrating the sugar.

In an embodiment, a second glass beaker 106 is used for mixing 3-7 grams rGO, 3-7 grams carbamide, 3-7 grams cobaltous, and 3-7 grams chromium nitrate and dissolving with double-distilled water.

In an embodiment, a magnetic stirrer 108 is used for stirring the mixed solution for 450 minutes to generate a homogenous solution and burning the uniform mixture at 425° C. in the preheated muffle furnace for 20 minutes to obtain graphene-cobalt chromate composite.

FIG. 2 illustrates a process for preparing reduced graphene-cobalt chromate composite for humidity sensor applications in accordance with an embodiment of the present disclosure. At step 202, the process 200 includes preparing black foam of reduced graphene oxide (rGO) after hydrating the 3-7 grams of sucrose using a preheated muffle furnace for 5-15 minutes.

At step 204, the process 200 includes mixing 3-7 grams rGO, 3-7 grams carbamide, 3-7 grams cobaltous, and 3-7 grams chromium nitrate in a second glass beaker 106 and dissolving with double-distilled water.

At step 206, the process 200 includes stirring the mixed solution for 450 minutes on a magnetic stirrer to generate a homogenous solution.

At step 208, the process 200 includes burning the uniform mixture at 425° C. in the preheated muffle furnace for 20 minutes to obtain graphene-cobalt chromate composite.

In another embodiment, the preparation of rGO comprises placing 3-7 grams of sucrose in a first glass beaker 102. Then, heating the first glass beaker 102 containing sucrose upon putting the first glass beaker 102 inside the preheated muffle furnace for 5-15 minutes at 450-500° C. in an oxygen environment. Then, obtaining the black foam of rGO after hydrating the sugar.

In another embodiment, preferably 5 g sucrose is placed inside the 100 mL borosil glass beaker 102 and further put straight into the preheated muffle furnace, which is maintained at 450° C. in an oxygen environment for about 7 minutes for dehydrating the sugar thereby producing the black foam, wherein the finished product is retrieved for additional examination.

In another embodiment, the preparation of rGo and cobalt chromate(CCR) is executed using the solution combustion technique, wherein the stoichiometric amounts of fuels (F) selected from carbamide and glucose, as well as oxidizers (O) like cobaltous and chromium nitrate is kept the O/F ratio at one.

In another embodiment, the obtained graphene-cobalt chromate composite is analyzed using XRD to check the crystallinity and to know the crystallite size, and the humidity sensing measurements are carried out using a humidity chamber, a computer with a set of instructions, and a digital multimeter.

In another embodiment, a humidity sensor fabricated using CCR-rGO composites to detect humidity at room temperature, wherein the phenomenal sensing response of 99% in the range of 11% to 97% RH, together with a very good reaction time of 8 s and recovery time of 9 s.

In another embodiment, the CCR-rGO composites sensor is prepared for sensing humidity on a common glass substrate using a low-cost spin coating method as opposed to in-situ polymerization to significantly enhance their overall performance and room temperature humidity sensing response, which is helpful for large-scale application and industrial production.

Preparation of rGO

Table sugar in the form of granulated sucrose is purchased from a retail store and utilized without additional purification. Granulated table sugar is used to make reduced graphene oxide (rGO). In a 100 mL borosil glass beaker 102, 5 g sucrose is placed. The cup is then put straight into the preheated muffle furnace, which is maintained at 450 10° C. in an oxygen environment. In about 7 minutes, the sugar dehydrates and produces a black foam. Finally, the finished product is retrieved for additional examination.

Preparation of Cobalt Chromate

The preparation of rGo and CCR is done using the solution combustion technique. the stoichiometric amounts of fuels (F) such carbamide and glucose, as well as oxidizers (O) like cobaltous and chromium nitrate, are utilized to manufacture the substance. The O/F ratio is kept at one. According to stoichiometry, transported in a 250 mL glass beaker 106 and dissolved with double-distilled water are all oxidizers and fuels. The mixed solution is stirred for 450 minutes on a magnetic stirrer to generate a homogenous solution. This uniform mixture is kept at 425° C. in a preheated muffle furnace. The burning process took 20 minutes to finish. The obtained samples are analyzed using XRD to check the crystallinity and to know the crystallite size. The humidity sensing measurements are carried out using a humidity chamber, a computer with a set of instructions, and a digital multimeter.

Figure 3:
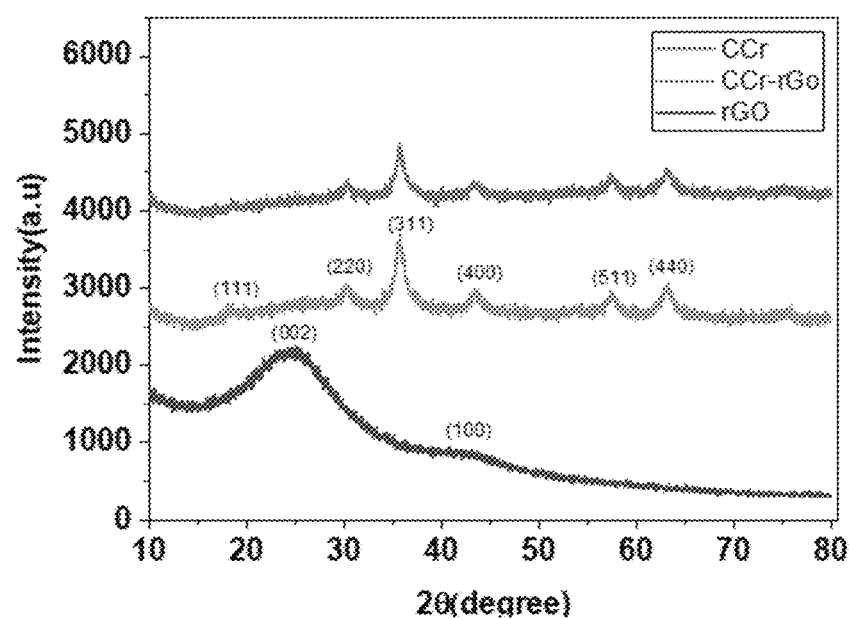
FIG. 3 illustrates a XRD patterns of CCR-rGO NPs in accordance with an embodiment of the present disclosure. The crystal planes verified that the CCR-rGO composite contains a spinel cubic structure.
Figure 4A:
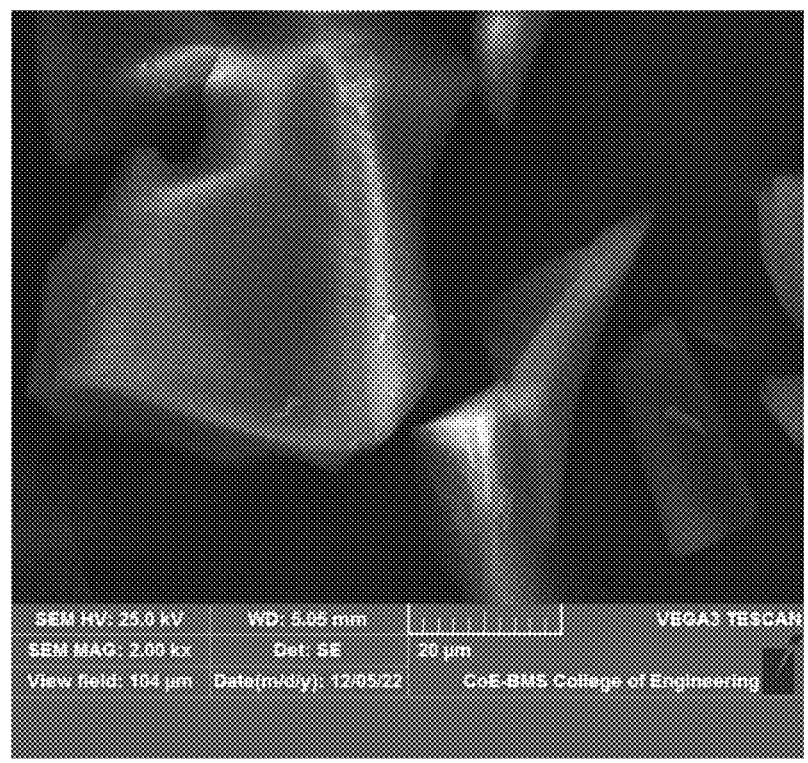
FIGS. 4A, 4B, 4C, 4D, 4E, and 4F illustrate a microstructure of rGO, rGO-CCR, and CCR respectively in accordance with an embodiment of the present disclosure.
Figure 4B:
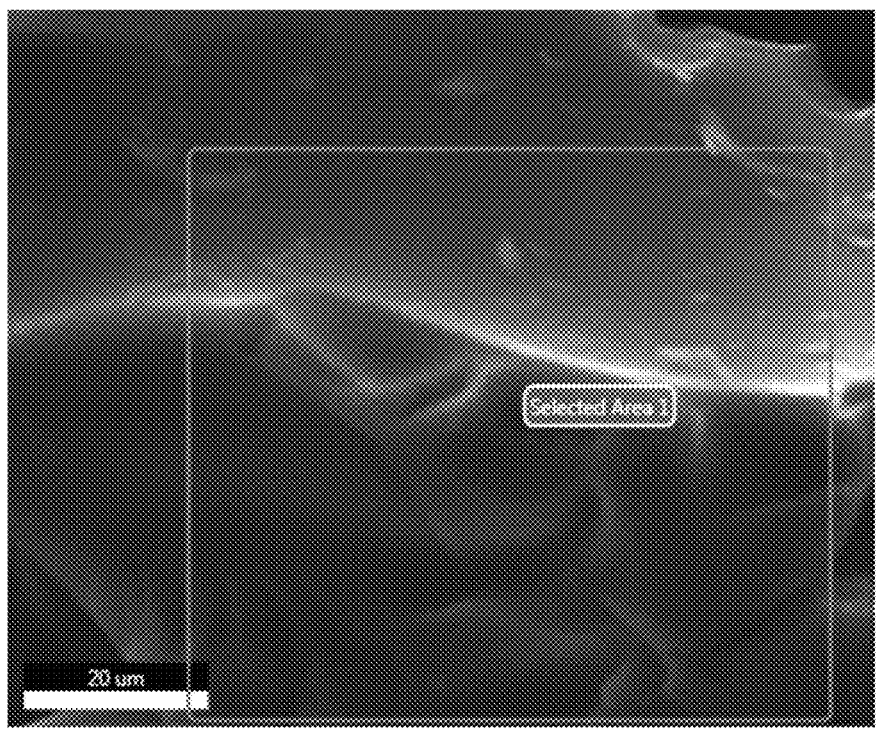
Figure 4C:
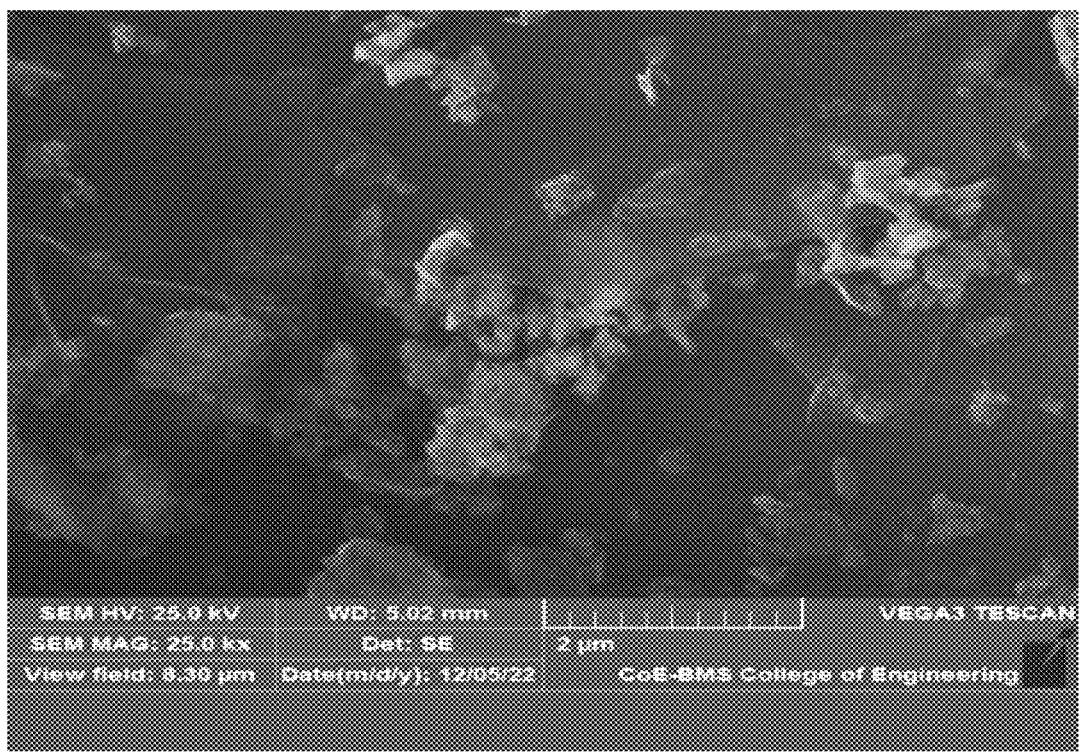
Figure 4D:
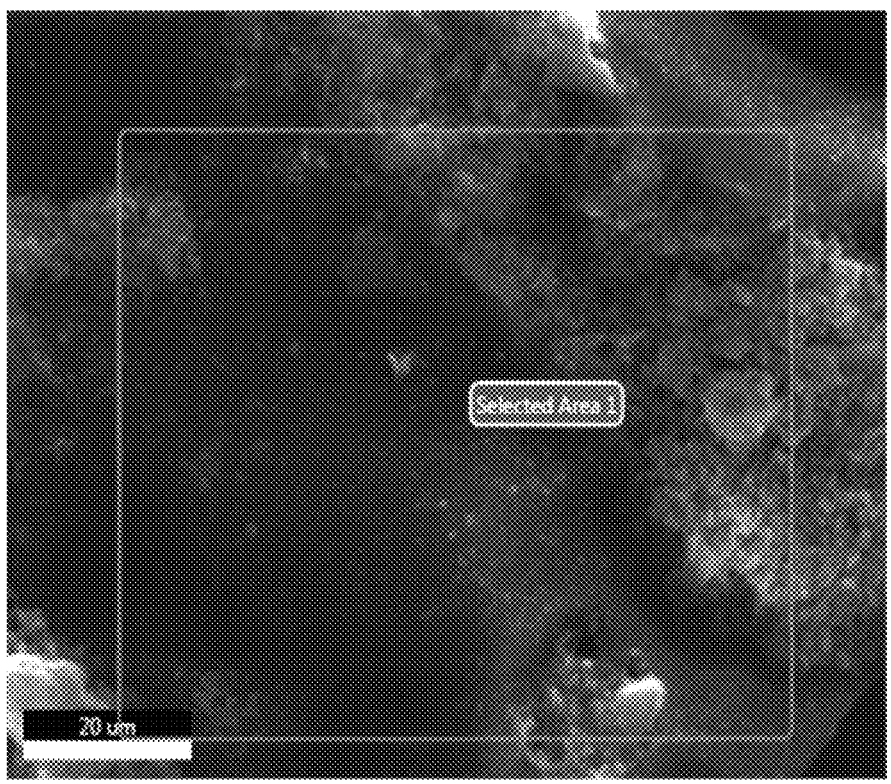
Figure 4E:
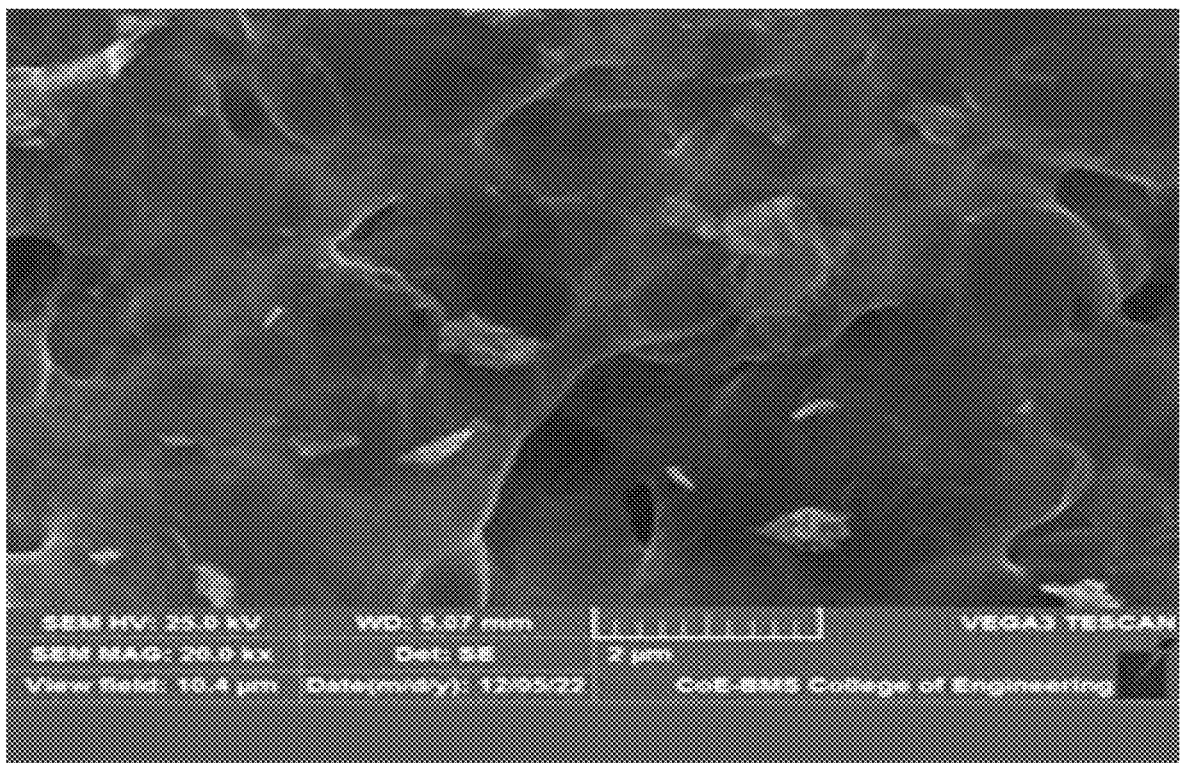
Figure 4F:
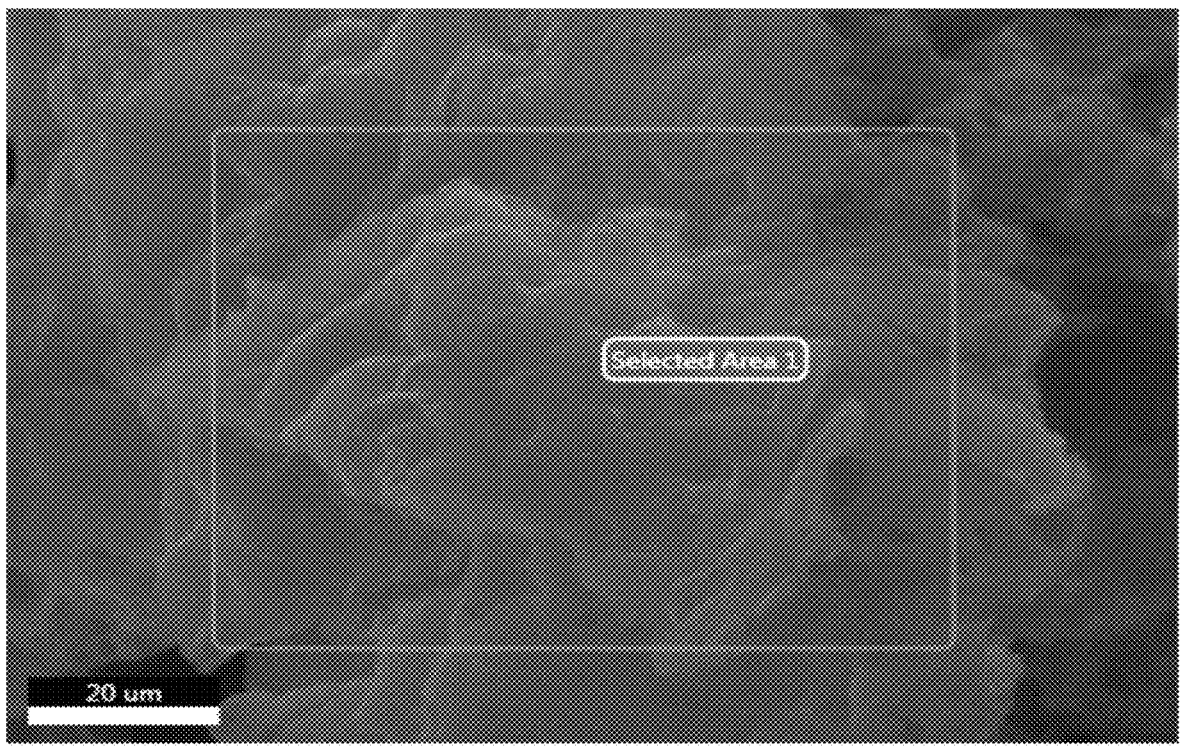

FIG. 3 illustrates a XRD patterns of CCR-rGO NPs in accordance with an embodiment of the present disclosure. The crystal planes verified that the CCR-rGO composite contains a spinel cubic structure.

The phases of each sample's structural and compositional details are ascertained using the pertinent XRD data. The as-prepared rGO XRD pattern (FIG. 3) shows a broad peak at 24°, corresponding to an interlayer d-spacing of 0.378 nm. The CCR XRD pattern reveals a diffraction peak with a spinel cubic structure. The peak frequently seen for CCR appears, suggesting that the material is in a spinel structure. The lattice parameter for the CCR-rGO composite is discovered to be between 8.345 and. The following relation, is used to estimate the average crystallite size (D).

$$D = \frac{0.9\lambda}{\beta \cos\theta} \text{ nm} \tag{1}$$

Samples are in nano size 10 nm. The size of the nano mater is decreasing with rGo-CCR composite. This will also confirm by XRD peak width. The XRD peak width is decreasing sample crystallinity and also falling for the rGo-CCR composite.

FIGS. 4A, 4B, 4C, 4D, 4E, and 4F illustrate a microstructure of rGO, rGO-CCR, and CCR respectively in accordance with an embodiment of the present disclosure. FIG. 4 displays the scanning electron microscopy (SEM), which depicts the morphology of rGo and the CCR-rGo composite material (a to c). The chemical conversion of graphite oxide to graphene is said to cause holes and flaws on the carbon grid in the publications that have been published in the scientific literature. It is probable that the loss of the oxygen functional group during the reduction process is what caused these holes to form. It is also conceivable for the nanocomposites to grow around the pores and imperfections in the graphene sheets, and they may have a propensity to embed themselves into the sheets. In addition to this, the stiff particles have the potential to quickly sink into the materials that are supporting them. Visual scrutiny reveals that the rGO image has a lighter appearance than the original. This is explained by the fact that the oxygen functional groups are eliminated during the reduction process. As a consequence of this, the previously separated GO sheets that are subjected to intercalation now adhere to one another, which leads to a reduction in the interlayer spacing of single sheets. This provides additional evidence that the rGO-CCR ratio has decreased.

Figure 5A:
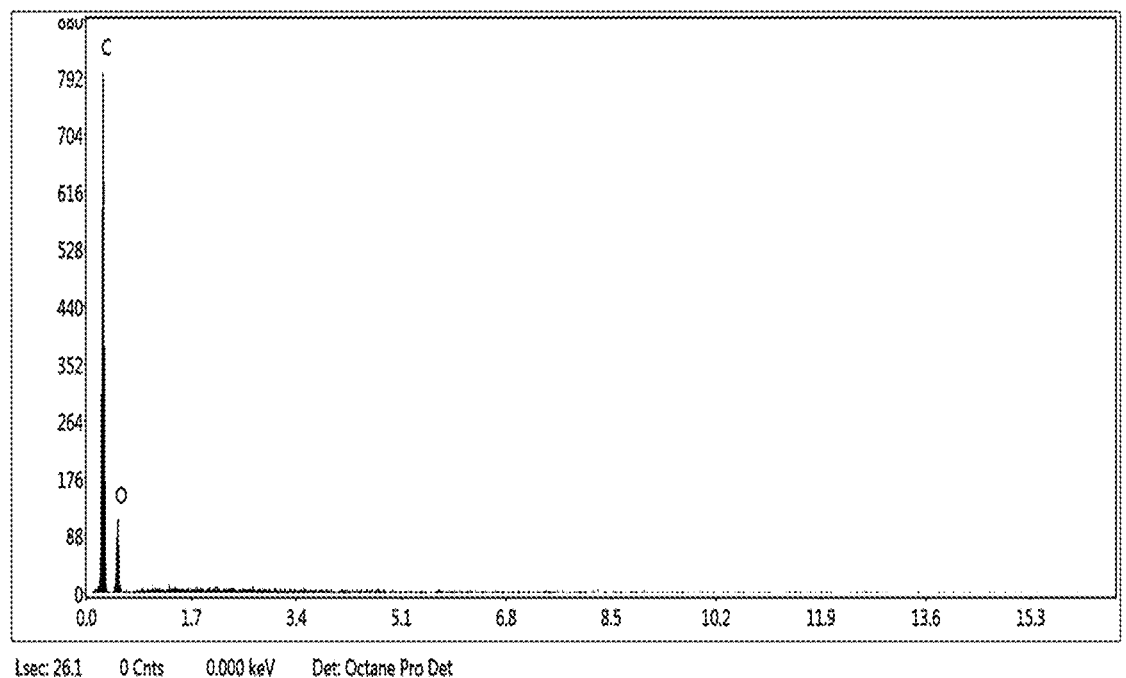
FIGS. 5A, 5B, and 5C illustrate a EDX spectrum of rGO, rGO-CCR, and CCR respectively in accordance with an embodiment of the present disclosure.
Figure 5B:
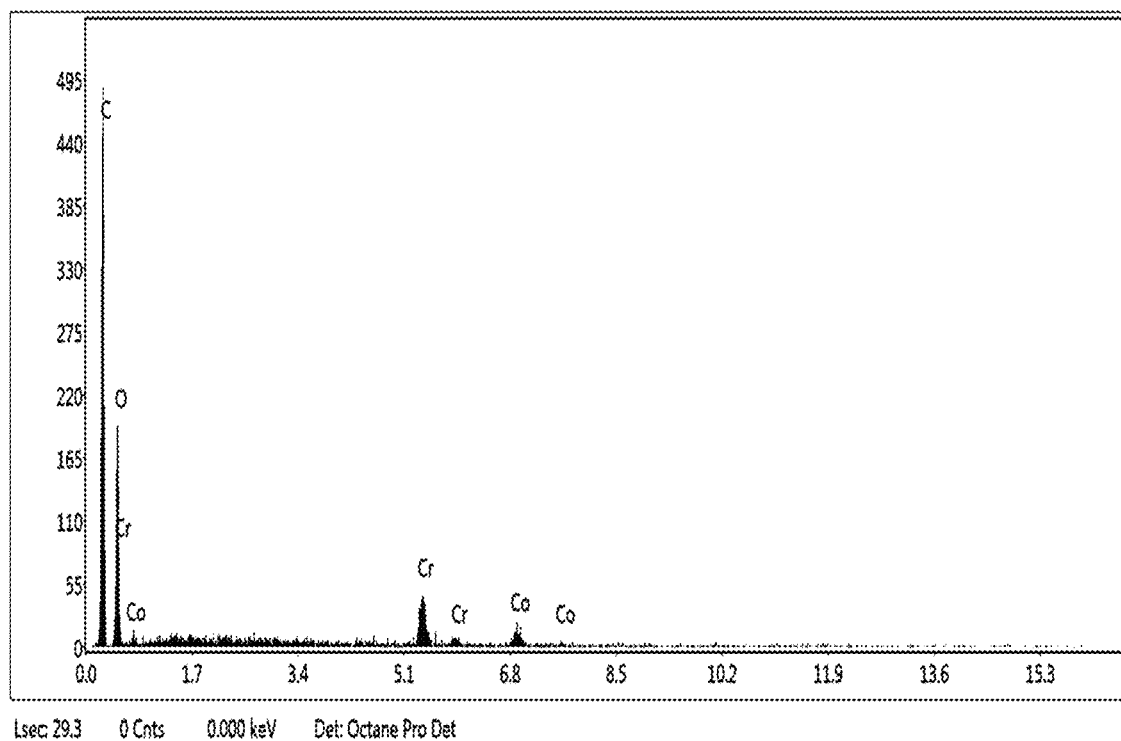
Figure 5C:
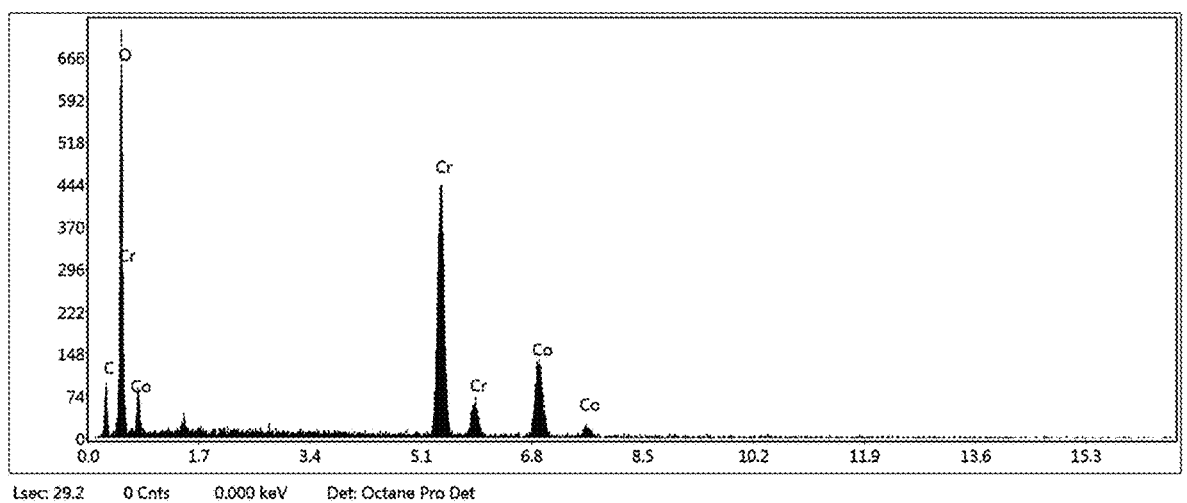

FIGS. 5A, 5B, and 5C illustrate a EDX spectrum of rGO, rGO-CCR, and CCR respectively in accordance with an embodiment of the present disclosure. In addition to this, the EDX method is utilized in order to investigate the spatial distribution of the element. It is clear that all components, including Co and Cr, are distributed in an even manner across the whole surface of the rGO-CCR composite.

Figure 6:
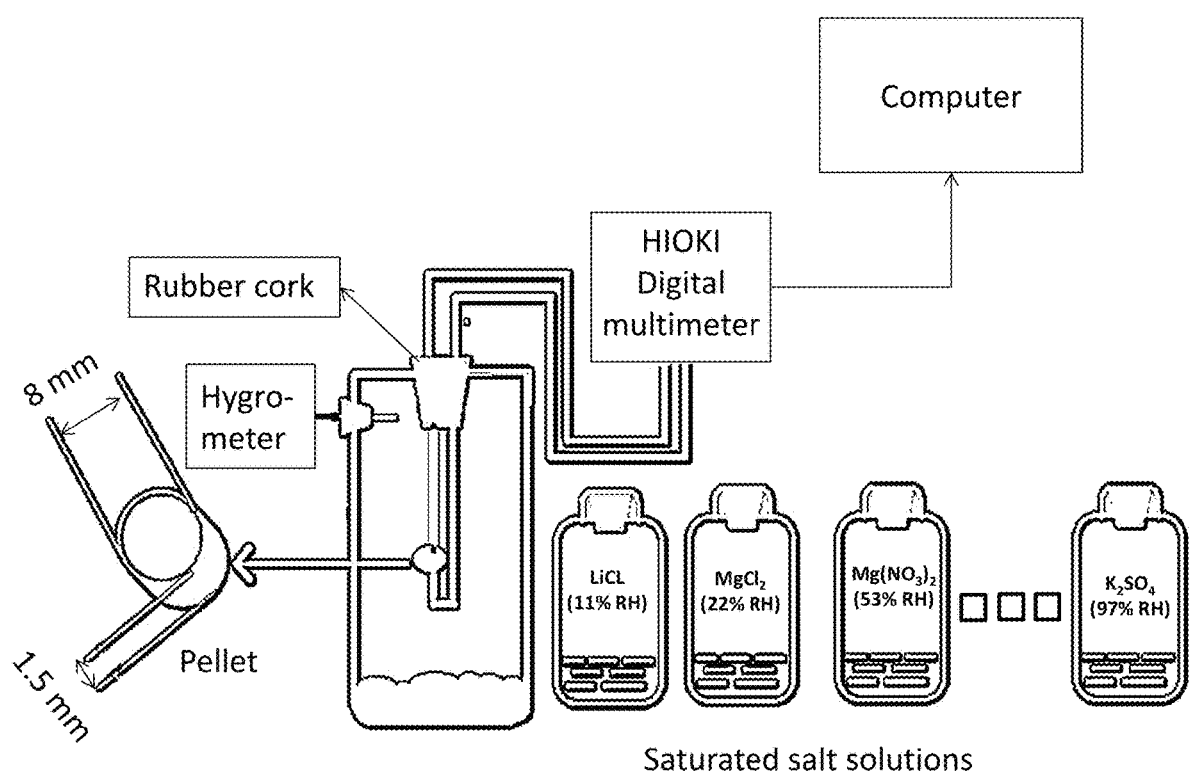
FIG. 6 illustrates a humidity sensing measurement setup in accordance with an embodiment of the present disclosure.

FIG. 6 illustrates a humidity sensing measurement setup in accordance with an embodiment of the present disclosure. FIG. 6 represents Humidity Sensing measurement setup.

Figure 7A:
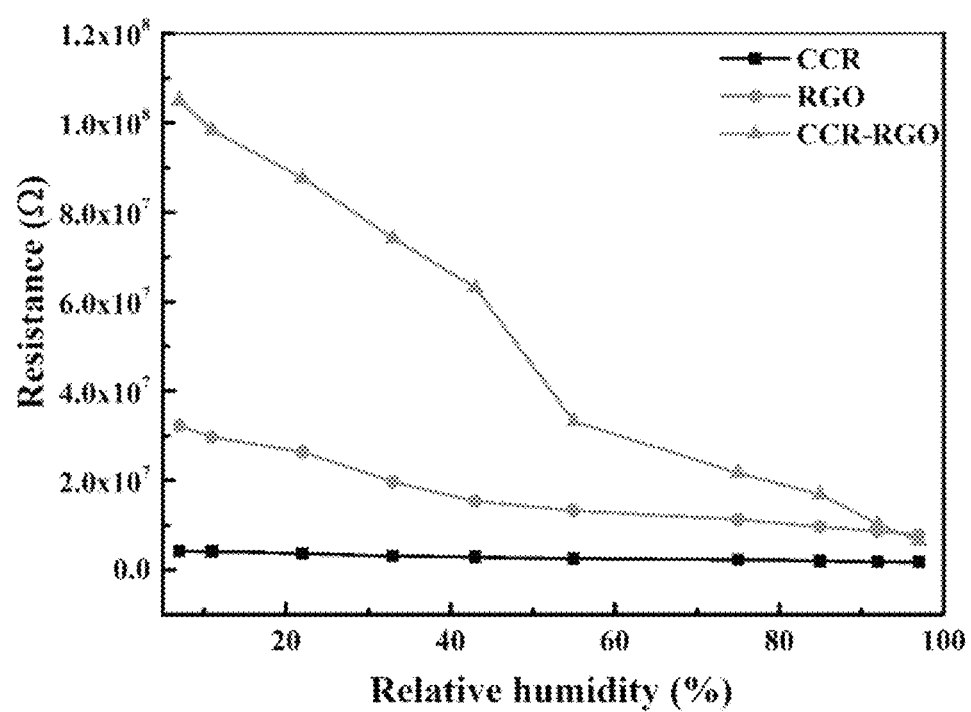
FIG. 7 illustrates (a) relationship between the resistivity and relative humidity of CCR-rGO, and (b) Variation of sensing response with relative humidity in accordance with an embodiment of the present disclosure.
Figure 7B:
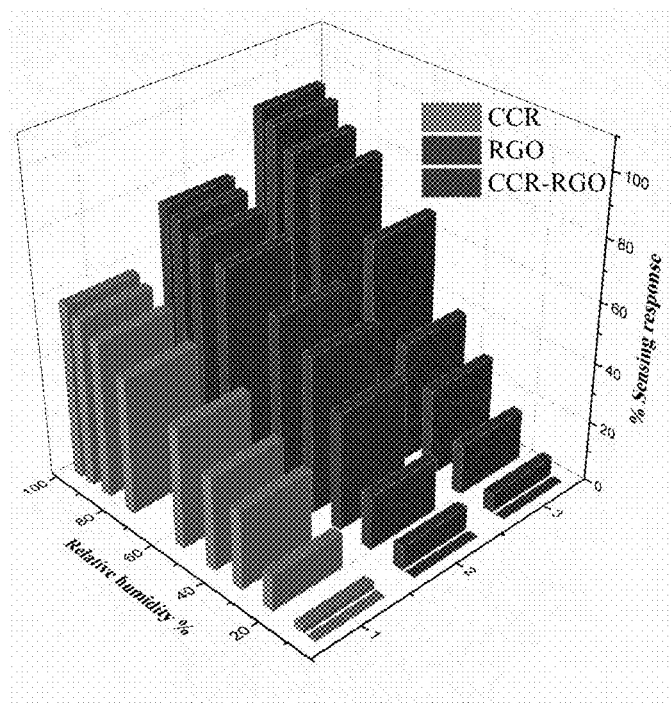

FIG. 7 illustrates (a) relationship between the resistivity and relative humidity of CCR-rGO and (b) Variation of sensing response with relative humidity in accordance with an embodiment of the present disclosure. FIGS. 7($a$) and ($b$) illustrates how resistance and sensing performance of CCR and rGO. The pure CCR resistance falls with % RH by less than an order of magnitude in the humidity range of 11% to 97% RH, and the associated sensing response is just 40%. However, when composites are investigated in the same RH range, resistance increased linearly by four orders of magnitude in a spectacular way. Additionally, the sensing responsiveness of the composites has improved with the addition of more rGo, peaking at 99.99% for CCR-rGO composite. The composites' excellent linear sensing responses, especially at low RH, is another noteworthy outcome. This result is remarkable when contrasted to that of many composites, for which, although having a very high sensing response shown at higher "RH" level. The hydrophilic functional groups of rGO found in the hybrid nanostructure of the composite.

Chemisorption's, physisorption's, and condensation are three sequential processes that can be used to explain the composite's reported sensing behavior. First, at lower relative humidity and water molecules chemically adsorb by sensor material, finally dissociating to form $OH^-$ and $H^+$ ions.

$$H_2O \Leftrightarrow OH^- + H^+$$

When water molecules first approach the sensing site, the hydrophilic groups in the composite induce OH ions to chemisorb onto the CCR-rGO composite and the $H^+$ ions to become mobile, decreasing the composite's resistance. The first chemisorbed layer is created by this. The first physisorbed layer is created as a result of hydrogen bonding between each water molecule and two nearby hydroxyl groups as the relative humidity rises, resulting in an immobile layer. Water molecules are simply adsorbed to the physisorbed layer when the relative humidity rises, becoming mobile as a result and generating a second physisorbed layer. More of these physisorbed layers accumulate as relative humidity rises, taking on the characteristics of bulk liquid water.

In this situation, the Grotthuss technique fails because every molecule of water connects to each OH group to generate $H_3O^+$, This splits into $H_2O$ and $H^+$ ions after that. As a result, the concentration of $H^+$ ions rise abruptly, causing them to become mobile and leap from one water molecule to another due to the simultaneous breakdown of the water molecules' hydrogen bond network and the covalent bonds of surrounding molecules. Water condenses into the interlayers of the composite film when the relative humidity level rises, electrolytic conduction is the outcome, further resistance reduction and an improvement in sensing responsiveness.

Figure 8:
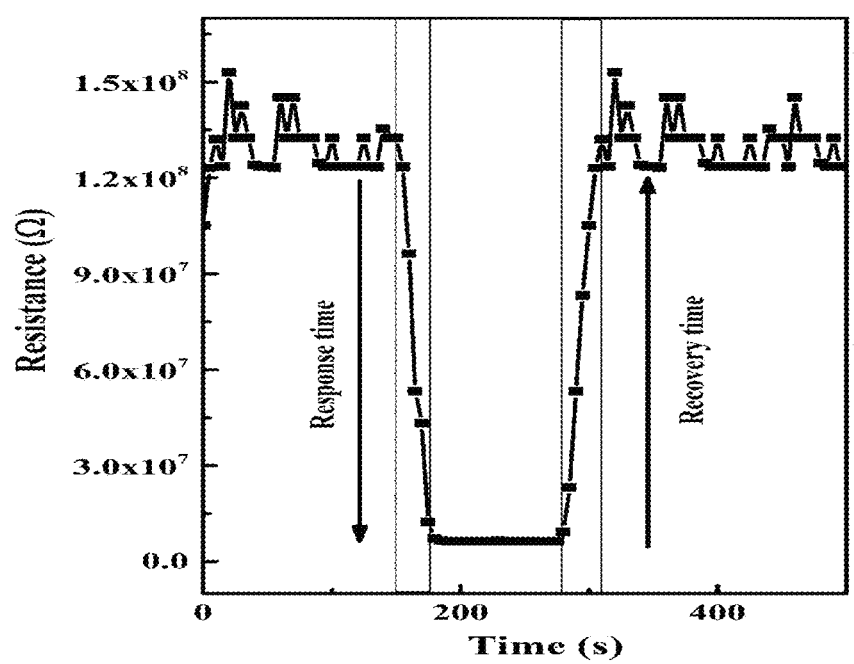
FIG. 8 illustrates a curve for sensing response and recovery time of the CCR-rGO in accordance with an embodiment of the present disclosure.

FIG. 8 illustrates a curve for sensing response and recovery time of the CCR-rGO in accordance with an embodiment of the present disclosure.

Humidity Response and Recovery Behavior

Important factors include response and recovery times, hysteresis, and stability for making a good and effective humidity detecting device. To enable for exact experimental evaluation of the response and recovery durations of all samples, two distinct compartments are kept, one had a relative humidity (RH) of 11%, whereas the other had a RH of 97% (FIG. 8). To test the reaction and recovery durations for each composite, each sample is switched from 11% RH to 97% RH and back again, with a switching period of 1 second in each case. The CCR-rGO sample exhibited a very strong 8 second reaction time and a 22 second recovery time. while the other composites averaged 18 s and 22 s.

Figure 9:
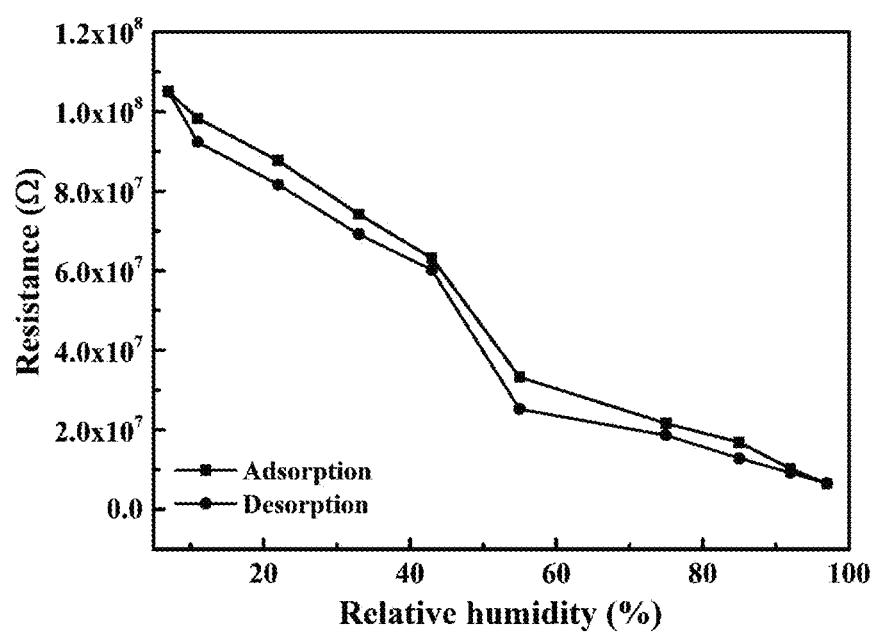
FIG. 9 illustrates a humidity hysteresis of CCR-rGO in accordance with an embodiment of the present disclosure.

FIG. 9 illustrates a humidity hysteresis of CCR-rGO in accordance with an embodiment of the present disclosure. A hysteresis curve is generated for each sample by recording the observed resistance values gained during desorption in the same range of RH and taking the same steps forward during adsorption. FIG. 9 depicts the generated curves. All composites exhibit hysteresis, demonstrating that while the desorption process is delayed, the adsorption process is spontaneous. When it comes to humidity sensing, this is due to the fact that desorption is an endothermic reaction while adsorption is an exothermic activity. With the increase in rGO concentration in the composite hysteresis has diminished and is at its lowest for the CCR sample.

Figure 10:
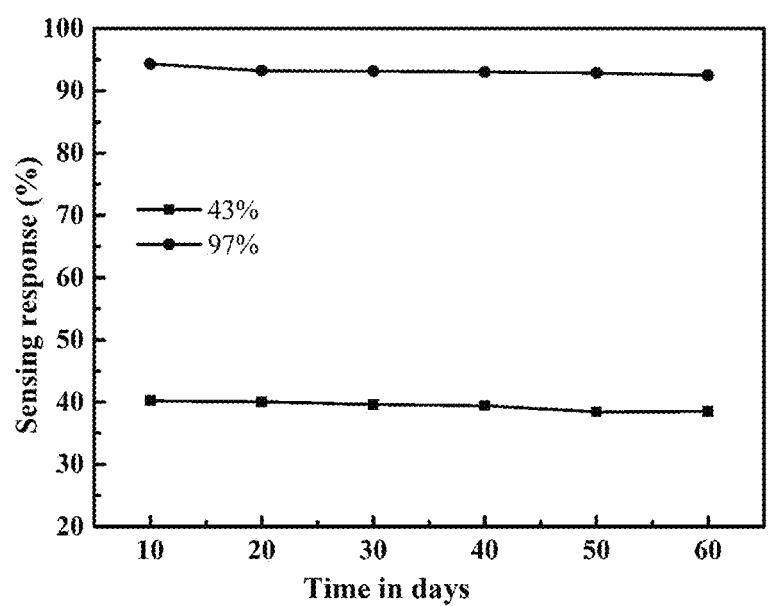
FIG. 10 illustrates a humidity sensing stability of CCR-rGO in accordance with an embodiment of the present disclosure.

FIG. 10 illustrates a humidity sensing stability of CCR-rGO in accordance with an embodiment of the present disclosure. Sensing responses of each composite are evaluated at 55% RH and 97% RH after every 10 days for two months in order to assess their stability as humidity sensors. The resulting graphs are presented in FIG. 10. As seen, the composites exhibit stable sensing. During that time, CCR-rGO composite shown the most stability. The CCR-rGO composite, out of all the composites examined, has demonstrated that in addition to being an effective humidity sensing material that is used at room temperature, it is also reliable and effective across the investigated range of % RH, making it the best choice for device manufacturing.

The method for the successful synthesis of rGO and CCR-rGO composites is offered. Utilizing rGO and creating CCR-rGO composites using a solution synthesis approach to maximize the composites' ability to detect humidity at room temperature have shown to be effective. A phenomenal sensing response of 99% in the range of 11% to 97% RH, together with a very good reaction time of 8 s and recovery time of 9 s, has been demonstrated by the composite CCR-rGO. Furthermore, the composite sensor has been demonstrated to be exceptionally stable with no hysteresis. As a result, the material provides the prospect of developing an efficient, low-cost humidity-sensing device that functions at room temperature. The study also demonstrates that other rGO-based composites can be prepared for sensing on a common glass substrate using a low-cost spin coating method as opposed to in-situ polymerization to significantly enhance their overall performance and room temperature humidity sensing response, which would be very helpful for large-scale application and industrial production.

A cobalt chromate(CCR)-rGO composite (large-scale manufacture of CCR-rGo composite), with simple solution combustion technique is constructed. This technique is simple, cost-effective, and uncomplicated. The increased room temperature operable humidity sensing responsiveness of rGo-CCR composite is fabricated. The SEM micrographs shows that ultrathin, wrinkled, paper-like, sphere shape, rod shape morphology. In addition to this, the EDX method is utilised in order to investigate the spatial distribution of the element. The most extraordinary sensing response for CCR-rGO between 11% and 97% relative humidity (RH) is 92%. The compound's response time is discovered to be 40 and 60 s, and the stability is examined over three months. Various adsorption process phases are used to describe the mechanism of humidity sensing schematically.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

Funding

This research was funded by Research Center for Advanced Materials Science (RCAMS), King Khalid University, Saudi Arabia, under grant number KKU/RCAMS/0021-23.

Acknowledgment

The authors extend their appreciation to the Research Center for Advanced Materials Science (RCAMS), King Khalid University, Saudi Arabia, for funding this work under grant number KKU/RCAMS/0021-23.

The invention claimed is:

1. A precursor composition for humidity sensor applications, the composition comprising:
    a powder extract of sucrose, from 3-7 grams;
    a powder extract of carbamide, from 3-7 grams;
    a powder extract of cobaltous, from 3-7 grams; and
    a powder extract of chromium nitrate, from 3-7 grams.
2. The precursor composition as claimed in claim 1, wherein a weight amount of sucrose, carbamide, cobaltous, and chromium nitrate is 5 grams.

* * * * *